No. 742,358. PATENTED OCT. 27, 1903.
G. A. SANDERS.
FANCY KNITTING MACHINE.
APPLICATION FILED AUG. 21, 1902.
NO MODEL. 8 SHEETS—SHEET 1.

No. 742,358. PATENTED OCT. 27, 1903.
G. A. SANDERS.
FANCY KNITTING MACHINE.
APPLICATION FILED AUG. 21, 1902.
NO MODEL. 8 SHEETS—SHEET 3.

WITNESSES—
J. A. McDermott
F. S. Elmore

INVENTOR—
George A. Sanders
by Anthony W. Browne
his Attorney

No. 742,358. PATENTED OCT. 27, 1903.
G. A. SANDERS.
FANCY KNITTING MACHINE.
APPLICATION FILED AUG. 21, 1902.
NO MODEL. 8 SHEETS—SHEET 5.
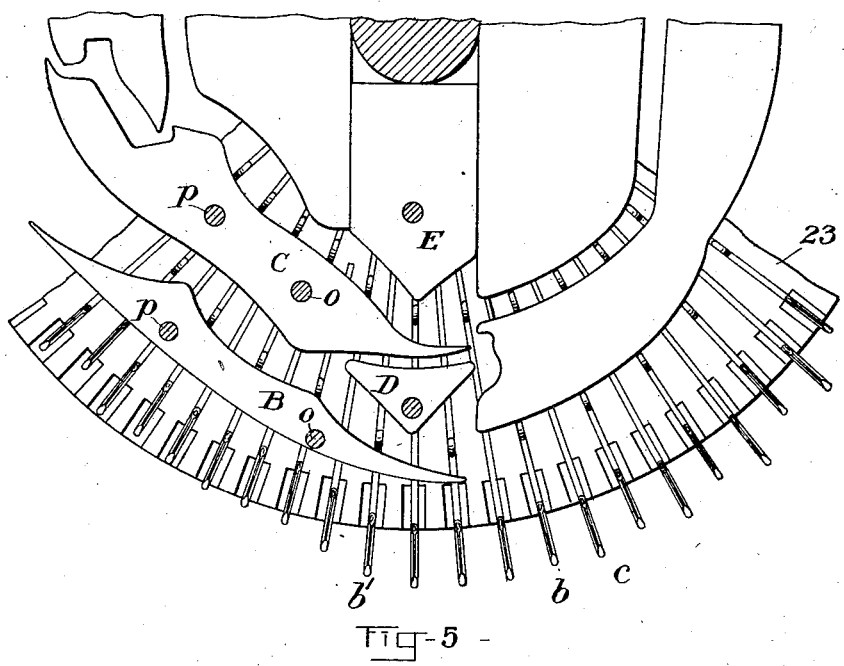
FIG-5-
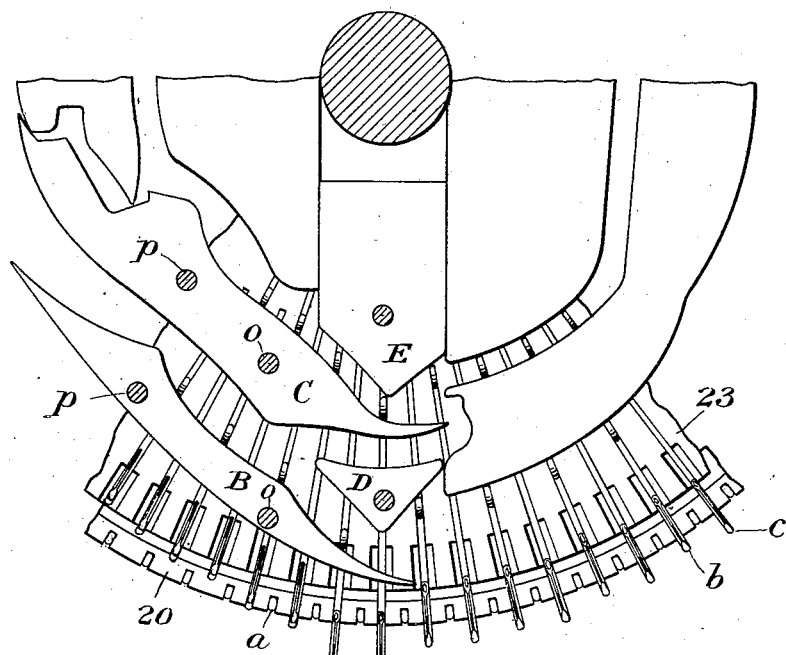
FIG-6-

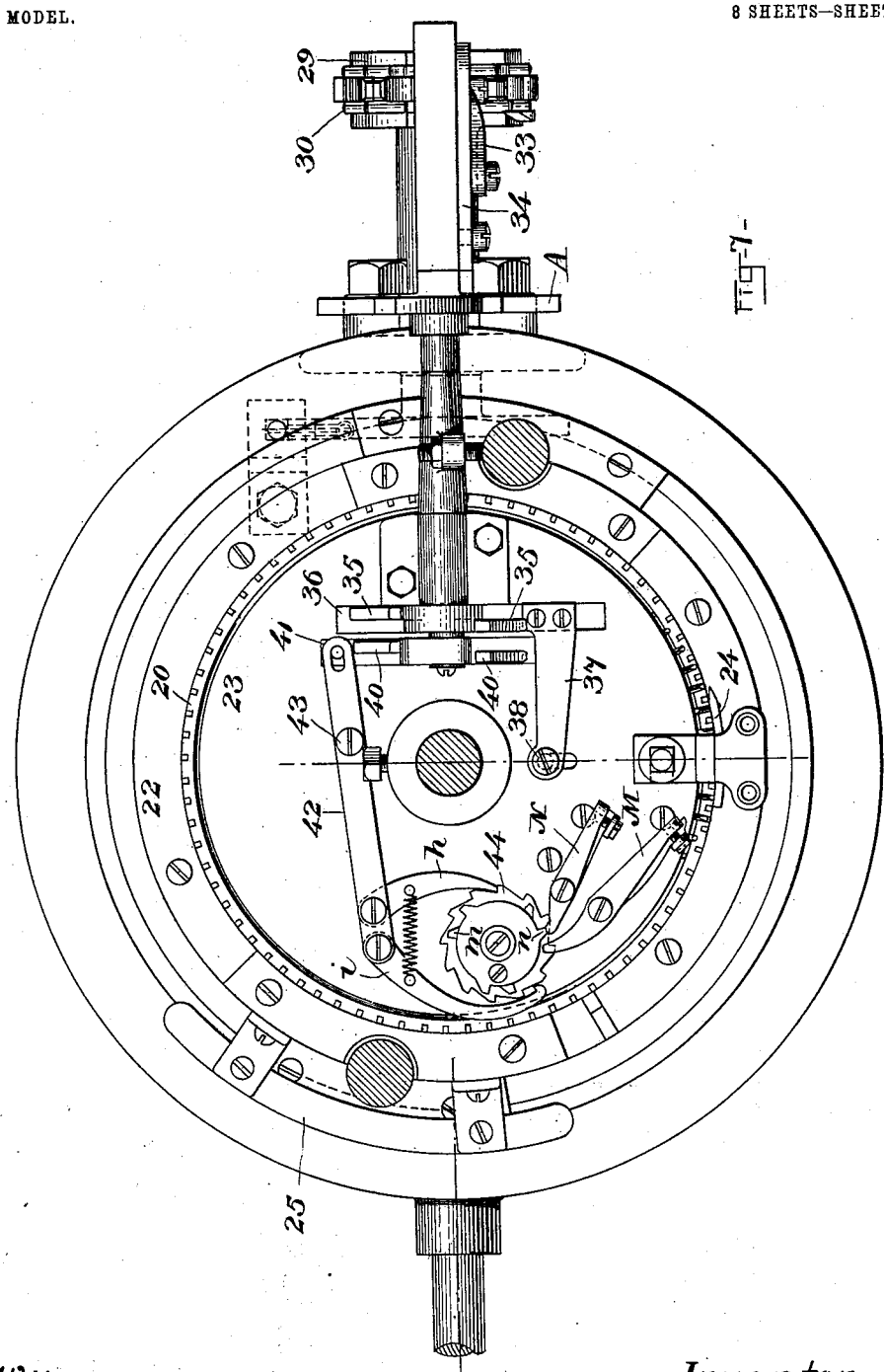

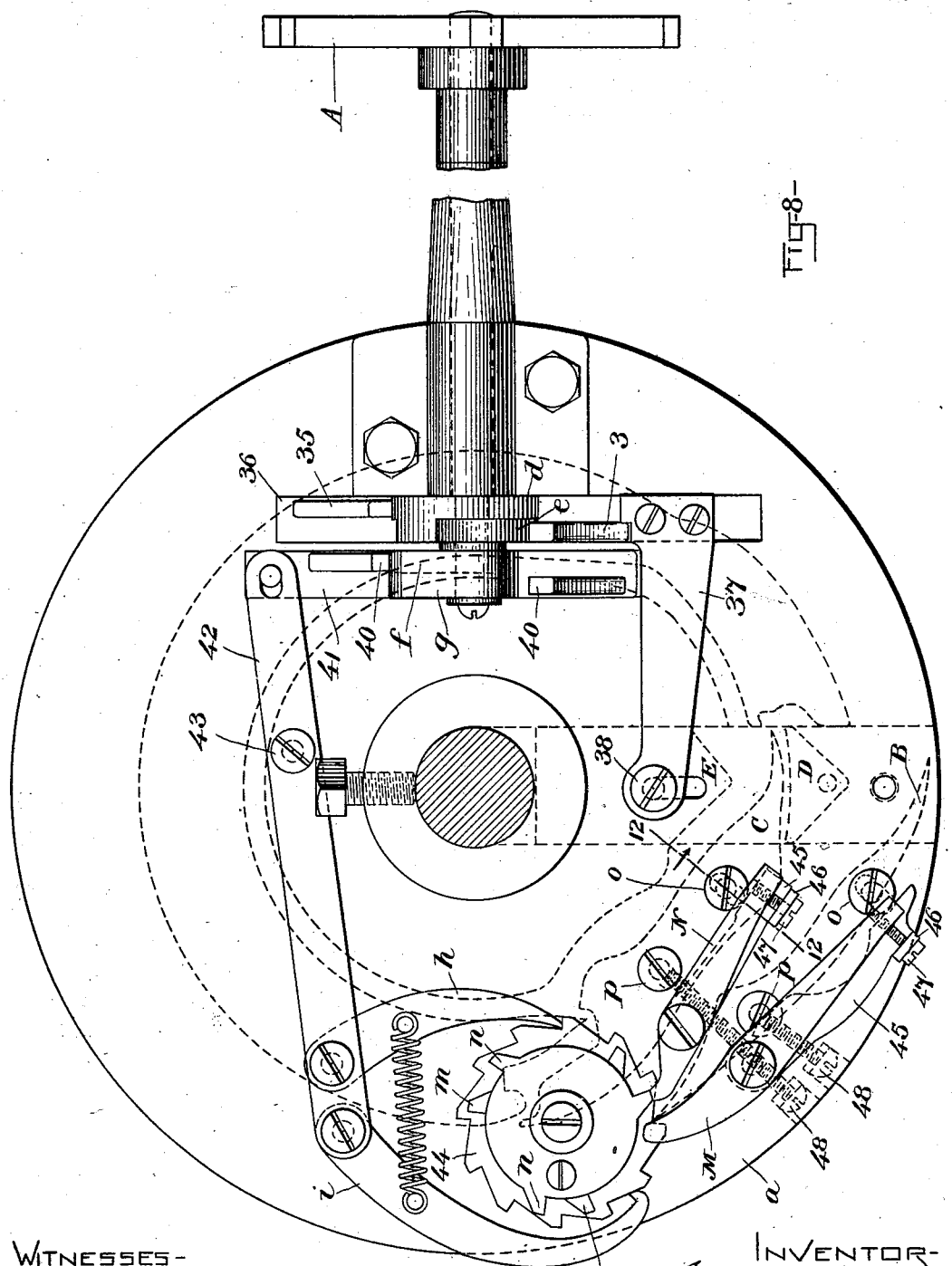

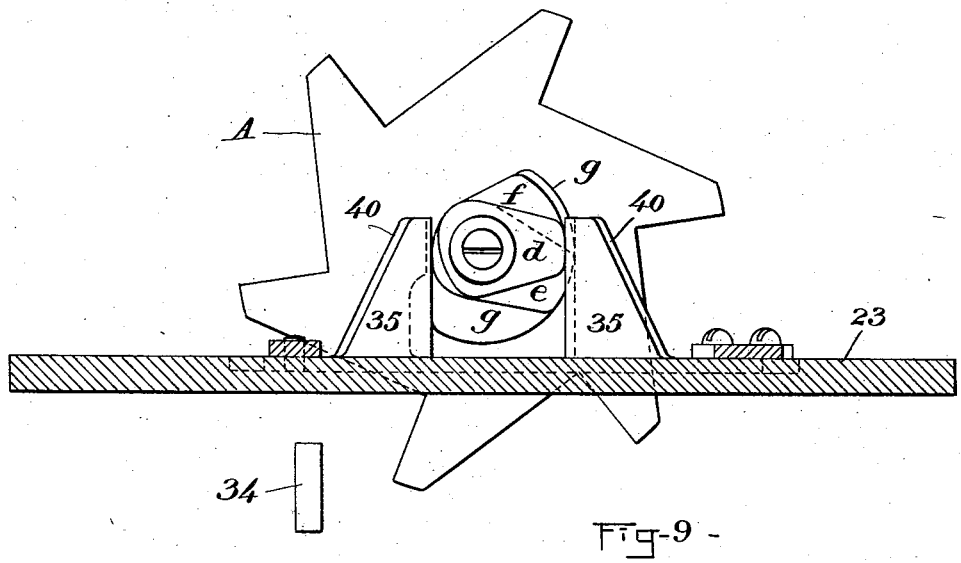
Fig-9-
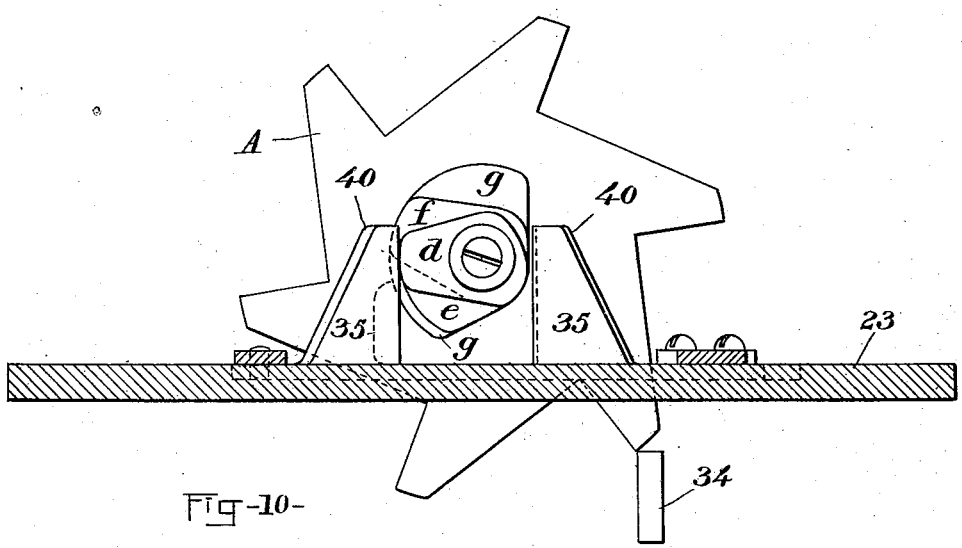
Fig-10-

No. 742,358. Patented October 27, 1903.

UNITED STATES PATENT OFFICE.

GEORGE A. SANDERS, OF LACONIA, NEW HAMPSHIRE.

FANCY-KNITTING MACHINE.

SPECIFICATION forming part of Letters Patent No. 742,358, dated October 27, 1903.

Application filed August 21, 1902. Serial No. 120,445. (No model.)

*To all whom it may concern:*

Be it known that I, GEORGE A. SANDERS, of Lakeport, in the city of Laconia, county of Belknap, and State of New Hampshire, have invented certain new and useful Improvements in Fancy-Knitting Machines, of which the following is a specification.

The object of this invention is to produce fancy-knit fabrics composed of tuck and rib stitches disposed in various ornamental ways, depending upon the particular pattern mechanism employed.

In order that my improvements may be readily understood, I will describe them as embodied in a circular independent latch-needle ribbing-knitting machine. Such an embodiment of the invention is illustrated in the accompanying drawings, in which—

Figure 1:
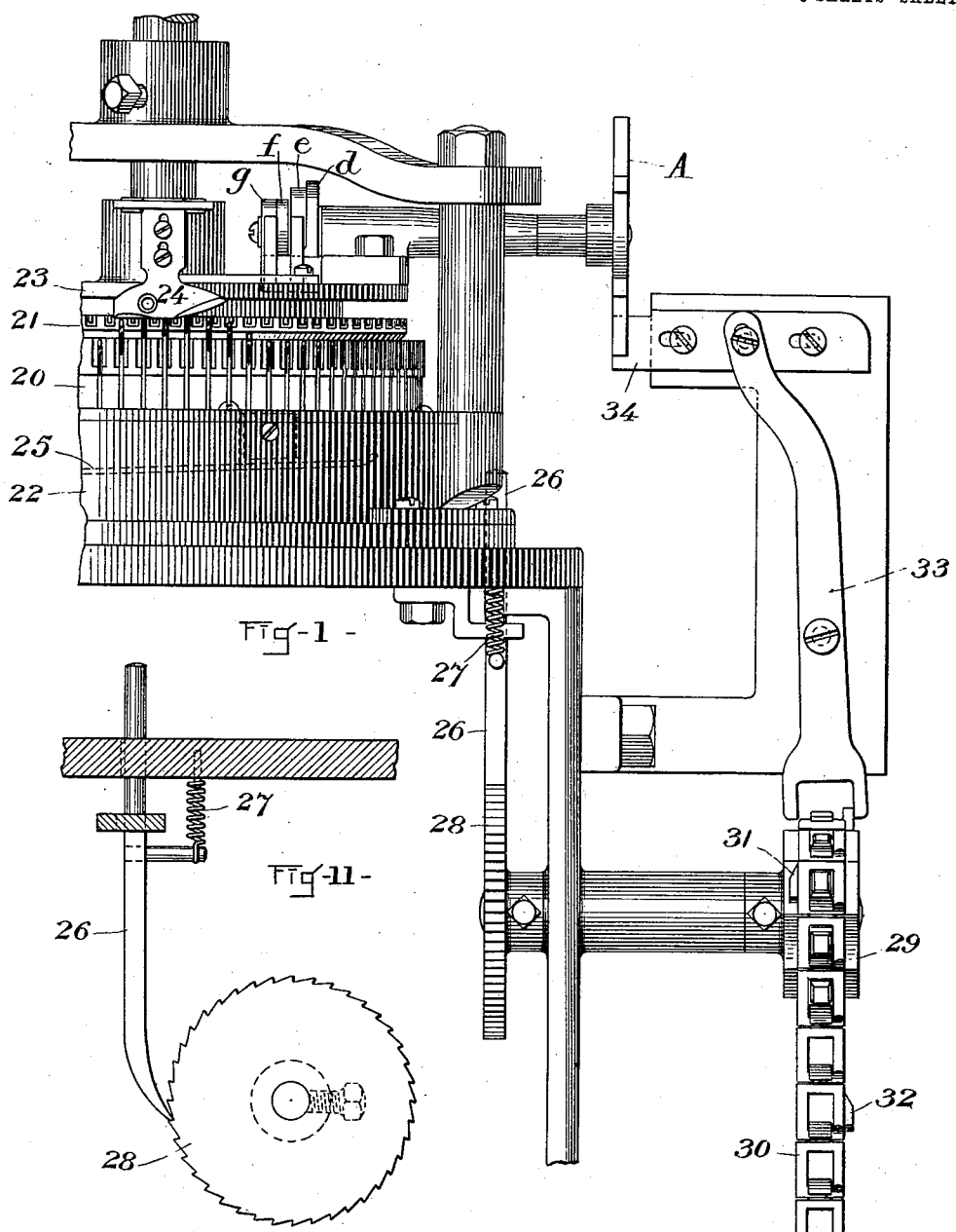
Figure 2:
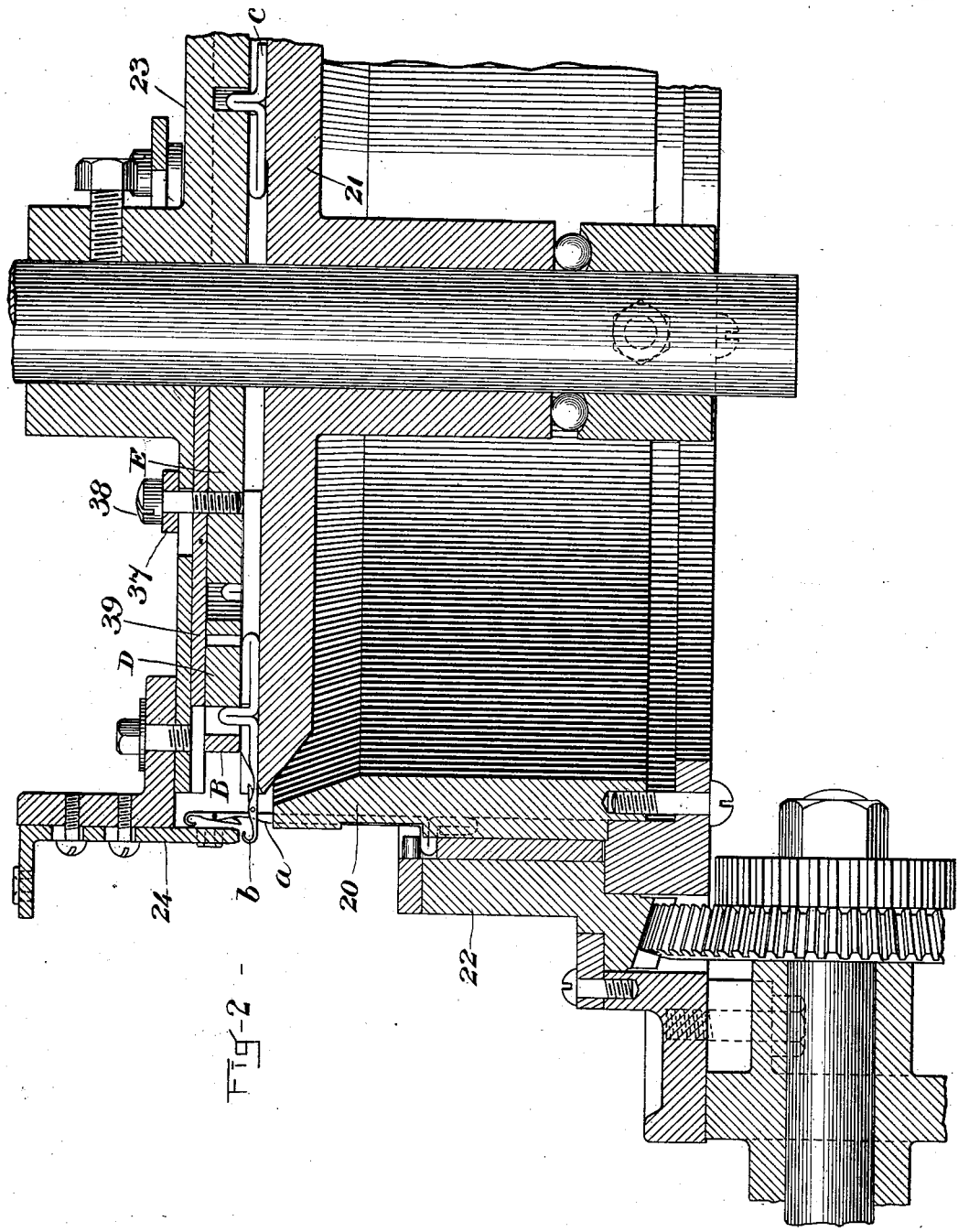
Figure 3:
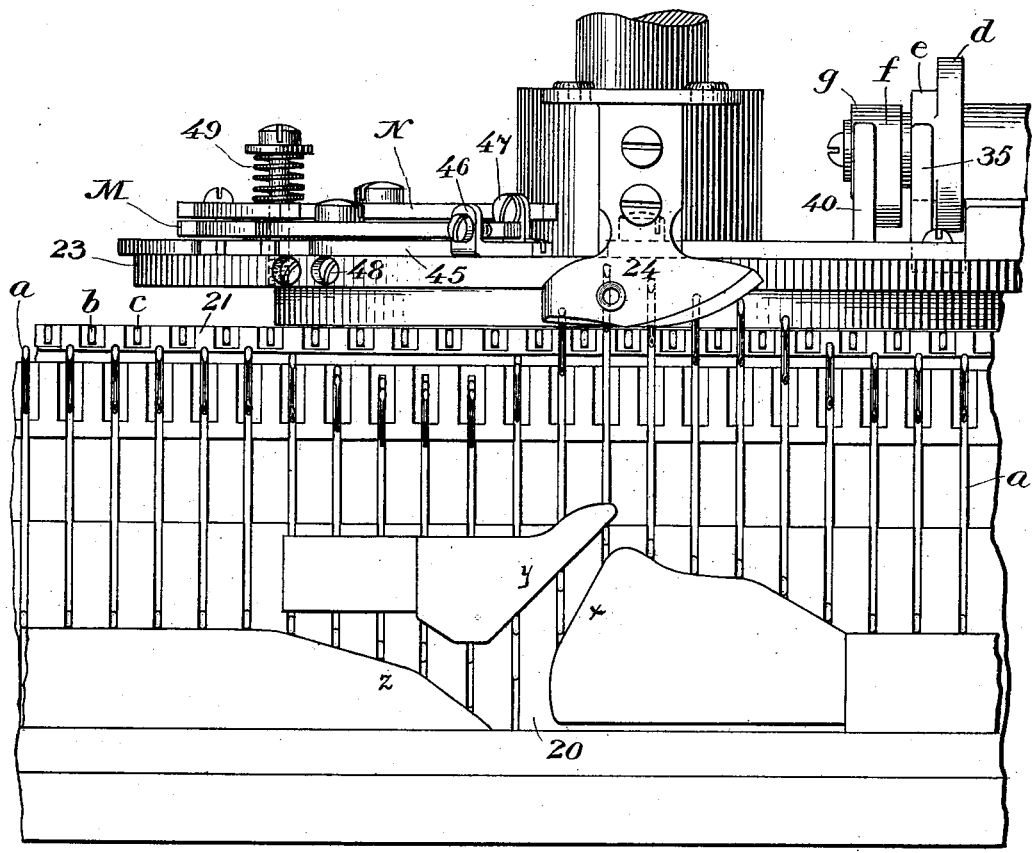
Figure 12:
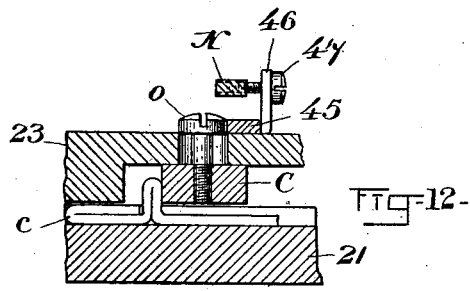
Figure 4:
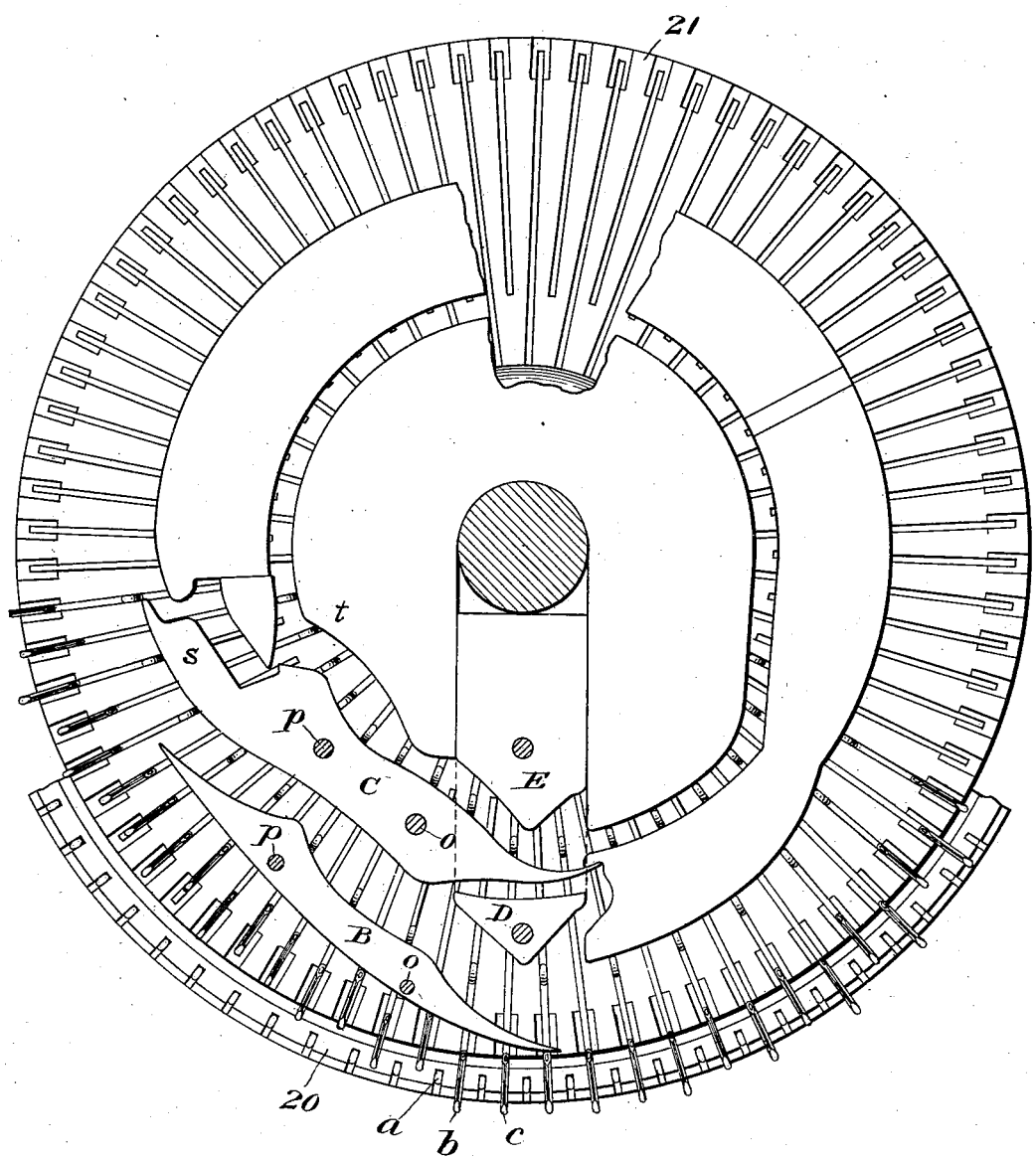

Figure 1 is a partial front elevation of the knitting-machine. Fig. 2 is a partial central vertical section. Fig. 3 is an elevation of part of the needle cylinder and dial, showing the location and arrangement of the knitting-cams for the cylinder-needles and showing the knitting-cams developed in the plane of the drawings. Fig. 4 is a plan view of the dial, showing the knitting-cams for the dial-needles and also showing the verge of the needle-cylinder. Figs. 5 and 6 show different positions of the dial-needle cams, Fig. 6 showing the verge of the needle-cylinder, said verge not being shown in Fig. 5. Fig. 7 is a plan view, partly in section, illustrating the devices for controlling the dial-needle knitting-cams. Fig. 8 is a view similar to Fig. 7, illustrating the connections between the dial-needle knitting-cams and their controlling devices. Figs. 9 and 10 illustrate in two different positions the star-wheel and cams which actuate the devices which control the dial-needle cams. Fig. 11 is a detail illustrating the means for actuating the pattern mechanism. Fig. 12 is a detail section in the plane indicated by the line 12 12 in Fig.
8. Figs. 1, 7, and 11 are drawn to the scale indicated on Sheet 1, and the remaining figures are drawn to scale twice as large.

The illustrated machine in its general characteristics is of a well-known type. It has (see Fig. 2) a stationary cylinder 20, carrying the gang of cylinder latch-needles $a$, a stationary dial 21, carrying the gang of dial-needles $b$ and $c$, a rotary cam-ring 22, carrying the knitting-cams which actuate the cylinder-needles, a rotary cam-plate 23, which carries the knitting-cams which actuate the dial latch-needles, and a rotary thread-guide 24 on the cam-plate, which delivers the yarn to the needles. In the respects thus referred to and as far as here described the machine is an ordinary circular independent latch-needle ribbing-knitting machine, the characteristics, construction, and mode of operation of which are well-known.

The knitting-cams for the cylinder-needles are shown in Fig. 3, but require no description, since they have no peculiarity. When the machine is in operation, the cylinder-needles $a$ knit continuously in the usual way, since their cams are constantly acting.

The present invention relates to the dial-needles, the means for controlling the same, and their coördination with the cylinder-needles, the fancy effects in the fabric being produced by appropriately actuating the dial-needles.

On referring to Fig. 4 it will be noted that there are two differing sets of dial-needles $b$ and $c$ of different lengths, the short and long needles alternating, and that the nibs of these needles travel in two different cam-paths, each set of needles having its own knitting-cams. The different pattern effects are produced by the movement of the knitting-cams B, C, D, and E, of which the cams B and D actuate the short needles $b$, while the cams C and E actuate the long needles $c$. The cams B and C may be conveniently identified as "threading-cams," since they determine by their differing positions whether the needles take the thread or not, and the cams D and E may be conveniently called the "cast-off" cams, since they determine by their positions whether the old loops on the dial-needles are cast off or not. The cast-off cams D and E are connected and move together, while the two threading-cams B and C are independently moved. The connection between the cast-off cams D and E is indicated in dotted lines in Fig. 4 and is also shown in full lines in Fig. 2, as hereinafter described. The cams B, C, D, and E, together with thre e-storing-cams $s$ $t$, (see Fig. 4,) constitute the knitting-cams for the dial-needles. The knitting-cams for the cylinder-needles are shown in Fig. 3, and they consist of the elevating or threading cam $x$, the draw-down or cast-off cam $y$, and the restoring-cam $z$. When the several cams are in the positions shown in Fig. 6, all of the dial-needles knit, and since, as shown, they alternate with the constantly-knitting cylinder-needles a one-and-one ribbed fabric is produced. Fig. 4 shows the two connected cast-off cams D and E and the long-needle threading-cam C moved in toward the axis of the machine, while the threading-cam B for the short dial-needles remains out. As a consequence neither set of needles casts off the loops thereon, and only the short needles take yarn as the yarn-guide 24 passes. It will be noted in this position that the cam C draws in the long dial-needles before they can take the yarn, whereas the short dial-needles remain out long enough to take the thread, just as they do when knitting. The short needles, however, do not knit, but simply hold both the old and the new loops, because their cast-off cam D is inactive. Fig. 5 shows the arrangement of cams reversed as compared with Fig. 4—that is to say, the cast-off cams D and E remain in the same positions, but now threading-cam C is out, while threading-cam B is in. Consequently the short dial-needles are now wholly inactive (except to hold on to such loop or loops as they may have) and do not take any loops, while the long dial-needles now take loops, but cast off neither the old nor the new loops, because the long dial-needles are not moved out by the cast-off cam far enough to carry their latches through the loops. These three views, 4, 5, and 6, show the three different dispositions of the dial knitting-cams of which the mechanism as illustrated is capable. As a result the two gangs of needles (dial and cylinder) may coöperate to knit a ribbed fabric, or the gang of cylinder-needles may continue to knit while first one set of the dial gang is tucking and then while the other set is tucking. By controlling the action of these cams B, C, D, and E through appropriate pattern mechanism it is obvious that various fancy effects in knit fabrics can be produced.

Suitable pattern and controlling mechanisms are illustrated in the drawings. As shown in Figs. 1 and 11, a cam 25 on the rotary ring 22 depresses a pawl 26, which is lifted by a spring 27. The pawl actuates a ratchet-disk 28 on a stub-shaft carrying a sprocket-wheel 29, which carries a pattern-chain 30. Projections 31 and 32 on opposite edges of this chain swing in opposite directions a lever 33, which in turn moves a tappet 34 in and out of the path of a star-wheel A, carried by the rotary cam-plate 24. The star-wheel shaft is equipped with appropriate cams $d$ $e$ $f$ $g$, (see Figs. 3, 8, 9, and 10,) which as the star-wheel is rotated govern the location of the cams B, C, D, and E. The cams $d$ and $e$ coöperate with abutments 35 on a slide 36 to move the same back and forth, and the slide is connected by arm 37 (see Fig. 8) and screw 38 to a slide 39, (see Fig. 2,) which carries the two cast-off cams D and E, said slide 39 and cams D and E being suitably guided to slide radially in the cam-plate 23. Consequently as the star-wheel A rotates the cast-off cams are moved into and out of operation. The other two cams $f$ and $g$ on the shaft of the star-wheel (see Fig. 8) coöperate with abutments 40 on a slide 41, thus moving said slide back and forth. This slide swings a pawl-lever 42, pivoted at 43 to the cam-plate 23, thus actuating two spring-pawls $h$ and $i$, which coöperate with a ratchet-wheel 44, turning on a stud on the cam-plate. In this way said ratchet-wheel is turned around. This ratchet-wheel carries two sets of tappets $m$ and $n$, one below the other, (see Fig. 8,) the lower set, $m$, coöperating with lever M and the upper set, $n$, with lever N, which levers actuate, respectively, the threading-cams B and C. As shown in Fig. 6, each cam B and C is pivoted at $p$ and each has a screw $o$ tapping into it. As shown in Fig. 12, this screw projects through a slot in the cap-plate, and against the head of the screw bears a lever 45, pivoted at the same center as the actuating-lever M or N. This lever 45 has an ear 46, through which loosely passes a screw 47, tapping into the actuating-lever M or N. This affords an adjustable connection between the actuating-lever and the threading-cam which is alike for both threading-cams. The pivots $p$ $p$ of both threading-cams are also adjustable by means of the screws 48. (See Fig. 8.) These adjusting devices enable the threading-cams to be accurately adjusted by hand at will. These adjustments, it will be noted, are independent of the automatic movements imparted to the cams by the pattern-controlled mechanism. The threading-cams B and C are moved in (away from the verge of the dial) by the means just described and are moved out by the dial-needles coming in contact with their inner faces.

It is obvious that the patterns eventually produced will depend not only upon the pattern-chain, but also upon the location of the cams $d$, $e$, $f$, and $g$ on the star-wheel shaft and upon the location of the tappets $m$ and $n$ on the ratchet-wheel 44. By varying these several cams and tappets, as well as by varying the pattern-chain, numerous different fancy-knit fabrics can be produced.

The ratchet-wheel 44, with its tappets $m$ and $n$, is held (where moved by the pawls $h$ and $i$) by the friction-spring 49. (See Fig. 3.)

The dial 21 (see Fig. 4) is shown provided with alternating long and short radial grooves for the long and short dial-needles, respectively, thus enabling finer work to be done than would be the case if the grooves were all equally long. The short grooves, it will be noted, are located between the long grooves at the outer portion of the dial. The drawings show an equal number of needles in the two gangs alternating one by one and an equal number of needles in the two sets comprising the dial gang, also alternating one by one; but this arrangement is not essential and is susceptible of modification. It is also obvious that various means can be employed instead of the particular devices for controlling the threading and cast-off cams for the dial gang of needles.

I claim as my invention—

1. A fancy circular independent latch-needle ribbing-knitting machine having, in combination, a gang of cylinder-needles, constantly-acting knitting-cams therefor, a gang of dial-needles comprising two sets of alternating needles, a set of knitting-cams for each set of dial-needles, each of said sets of cams comprising a movable cast-off cam, and a movable threading-cam, the two cast-off cams being connected to move together, and the two threading-cams being separately movable, and pattern-controlled mechanism for actuating said cast-off and threading cams.

2. A fancy-knitting machine, having, in combination, two coöperating gangs of needles, constantly-acting knitting-cams for one of said gangs, the other of said gangs comprising two sets of needles, a set of knitting-cams for each of said two sets of needles, each of said sets of cams comprising a movable threading-cam and a movable cast-off cam, and pattern-controlled means for moving said cams.

3. A fancy-knitting machine having, in combination, a gang of needles comprising two sets of needles, two sets of cams for actuating the same respectively, each of said sets comprising a movable threading-cam and a movable cast-off cam, and pattern-controlled means for moving said cams.

In witness whereof I have hereunto signed my name in the presence of two subscribing witnesses.

GEORGE A. SANDERS.

Witnesses:
W. L. WOODWORTH,
ERNEST C. WHITEKER.